US006382240B1

(12) United States Patent
MacDonald

(10) Patent No.: US 6,382,240 B1
(45) Date of Patent: May 7, 2002

(54) APPARATUS FOR FUEL TANKER OVEFLOW DIVERSION AND VAPOR SEPARATION

(76) Inventor: William David MacDonald, 2687 N. 700 W., Andrews, IN (US) 46702

(*) Notice: Subject to any disclaimer, the term of this patent is extended or adjusted under 35 U.S.C. 154(b) by 0 days.

(21) Appl. No.: 09/595,292

(22) Filed: Jun. 15, 2000

(51) Int. Cl.[7] .......................... B65B 3/18; F16K 24/00; F17C 13/00

(52) U.S. Cl. ...................... 137/312; 137/255; 137/587; 141/290; 141/302

(58) Field of Search ................................ 137/312, 587, 137/588, 255, 266, 267; 141/59, 285, 290, 301, 302; 220/749

(56) References Cited

U.S. PATENT DOCUMENTS

| | | | | | |
|---|---|---|---|---|---|
| 2,056,828 | A | * | 10/1936 | Clawson | 141/290 |
| 2,803,269 | A | * | 8/1957 | Switzer | 141/290 |
| 2,853,149 | A | * | 9/1958 | Gosselin | 137/415 |
| 2,928,436 | A | | 3/1960 | Wendrow et al. | 141/302 |
| 3,372,715 | A | * | 3/1968 | Ashton | 141/290 |
| 3,662,794 | A | * | 5/1972 | Turner | 137/587 |
| 3,807,433 | A | * | 4/1974 | Byrd | 141/290 |
| 3,825,045 | A | * | 7/1974 | Bloomquist | 141/302 |
| 3,908,718 | A | * | 9/1975 | Bower | 137/587 |
| 4,058,148 | A | * | 11/1977 | Potter | 141/290 |
| 4,320,788 | A | | 3/1982 | Lord | 141/290 |
| 4,592,386 | A | * | 6/1986 | Mooney | 137/588 |
| 5,018,558 | A | * | 5/1991 | Sharp | 137/587 |
| 5,099,872 | A | | 3/1992 | Tarvin et al. | 137/312 |
| 5,529,098 | A | | 6/1996 | Bravo | 137/312 |
| 5,967,174 | A | | 10/1999 | MacDonald | 137/312 |

* cited by examiner

*Primary Examiner*—George L. Walton
(74) *Attorney, Agent, or Firm*—O'Malley and Firestone

(57) ABSTRACT

An apparatus for recovering spills of volatile liquids overflowing from a mobile delivery tank is disclosed. The mobile delivery tank has an inlet to the top of the mobile delivery tank, a vapor return conduit in fluid communication with the inlet, and a drain from the vapor return conduit, an open end of which drain is accessible from outside the mobile delivery tank. An external recovery tank is provided to receive that portion of the overflowing fuel still in liquid form. An overhead vapor recovery line receives the vapor portion. A Y-connector attaches to the open end of the drain, the connector including a branched element where one branch is connected to the overhead vapor recovery line and a second branch is connected to the recovery tank.

2 Claims, 3 Drawing Sheets

APPARATUS FOR FUEL TANKER OVEFLOW DIVERSION AND VAPOR SEPARATION

BACKGROUND OF THE INVENTION

1. Field of the Invention

The present invention relates to the containment and recovery of volatile liquids which have overflowed from tanker trucks.

2. Description of the Prior Art

Volatile liquid fuels are usually distributed from refinery to end user vehicles with at least two intermediate stages. The stages are usually by pipeline to regional bulk storage plants, and then by tanker truck from the bulk plant to filling stations. Whether loaded at a refinery, regional or local bulk plant, there is the potential for the accidental overfilling of tanker trucks, notwithstanding the use of automatic shut off mechanisms and other safeguards.

In U.S. Pat. No. 5,967,174 the present inventor addressed the problem of fuel spills which can occur upon filling top loading tanker trucks at small bulk plants. On such trucks a catch basin positioned on top of the tank around the tank inlet collected any spilled fuel and directed it toward drains at one end of the tank. A quick release hose could then be connected to the drain to divert fuel to a storage tank.

Problems with spills and overflows also occur at large fuel distribution farms, notwithstanding the greater sophistication of the equipment. Tankers loaded at fuel distribution farms tend to be side filling. Valves located at the top of the tanks allow fuel vapor to escape. Sensors located at the tops of the tanks are used to determine when liquid levels reach the tops of the tanks to automatically shut off fuel flow. Sometimes these sensors are inoperative, typically because of failure of associated electronics. When this occurs fuel can escape through the valves into channels running along the top of the trucks and from there into recovery basins. The prevention of release of fuel into the environment is best effected by preventing the release of fluid fuel as either liquid or gas.

SUMMARY OF THE INVENTION

The invention comprises an apparatus and method for recovering spills of volatile liquids overflowing from a mobile delivery tank. The mobile delivery tank has an inlet to the top of the mobile delivery tank, a vapor return conduit in fluid communication with the inlet, and a drain from the vapor return conduit, an open end of which drain is accessible from outside the mobile delivery tank. An external recovery tank is provided to receive that portion of the overflowing fuel still in liquid form. An overhead vapor recovery line receives the vapor portion. A Y or T-connector attaches to the open end of the drain, the connector including a branched element where one branch is connected to the overhead vapor recovery line and a second branch is connected to the recovery tank.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
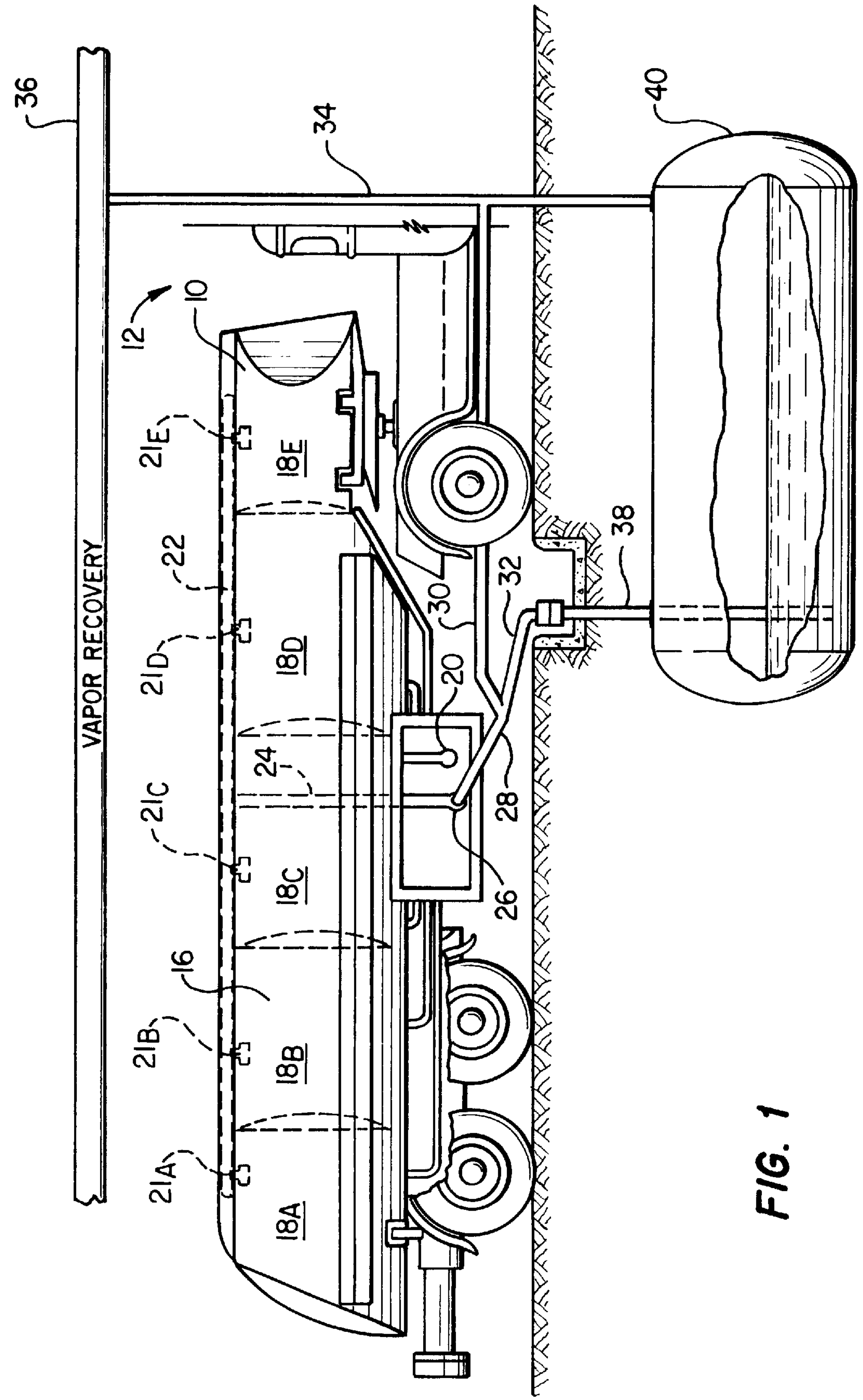
FIG. 1 is a side elevation of a tanker trailer illustrating the invention.

Referring now to the figures and particularly to FIG. 1, apparatuses illustrative of the invention and its preferred embodiment are shown. The invention relates to fuel transfer occurring at a bulk plant to tanker trucks 12 or 14 (See FIG. 3) and more particularly to the recovery of spills resulting upon overfilling of the tanker trucks and to separation of vapors from spilled liquid. The invention may be readily applied to different kinds of bottom loading trucks as described below.

Tanker truck 12 includes a towed tanker trailer 10 which carries a tank 16 of five fuel storage compartments 18A–E. Compartments 18A–E are filled from the bottom through an inlet 20 positioned in the side of trailer 10. As compartments 18A–E fill the rising liquid level forces air and fuel vapors out from the compartments through vapor vent valves 21A–E into a channel 22 running along the top of trailer 10. Liquids drain from channel 22 along a down pipe 24 which passes through tank 16 to a drain 26 in the side of trailer 10.

Externally coupled to drain 26 at the side of trailer 10 is a branched pipe 28 into which liquid from down pipe 24 flows and into which some vapor is forced. Branched pipe 28 has two branches, a vapor channel 30 and a liquid channel 32. Vapor channel 30 is connected to a pipe 34 which in turn is connected to an overhead vapor recovery line 36. Liquid channel 32 is connected to an inlet pipe 38 to an underground receiving tank 40 for fuel runoff. Receiving tank 40 is connected to pipe 34 as a vapor pressure release path to the vapor recovery line 36. It is not necessary to the invention that receiving tank 40 and the vapor channel 30 of the branched pipe 28 be connected by the same pipe to vapor recovery.

Figure 2:
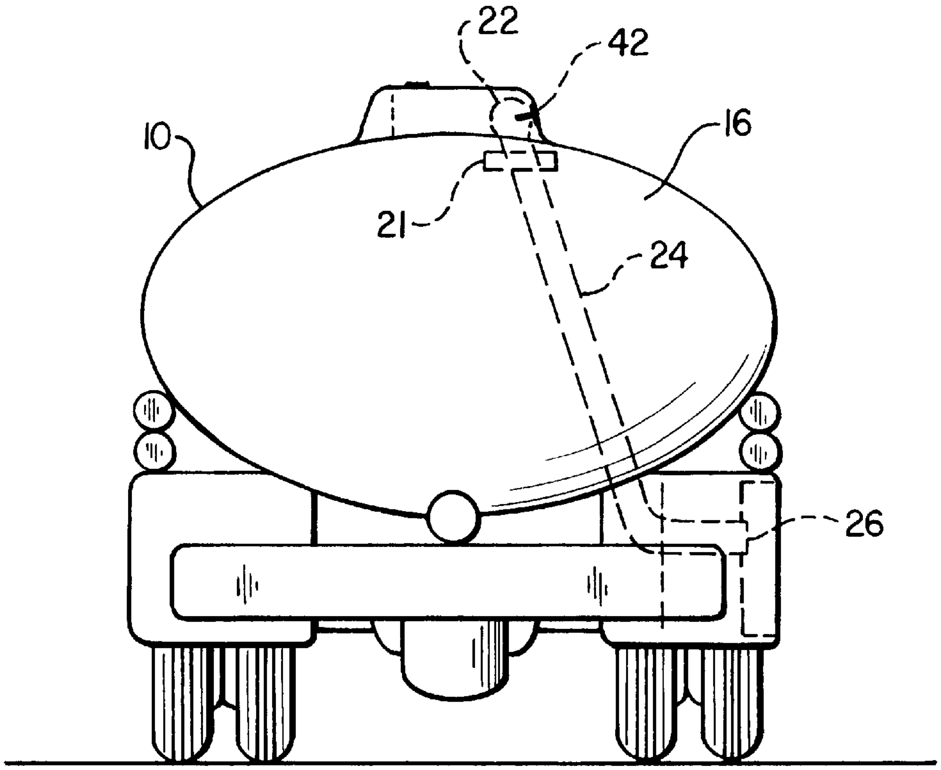
FIG. 2 is a rear elevation of the tanker trailer of FIG. 1.

FIG. 2 illustrates trailer 10 in a rear elevation showing the position of downpipe 24 through tank 16. Channel 22 runs along the top of trailer 10 inside, and to one side of an enclosed dome 42 on top of tank 16. Downpipe 24 is angled from the dome 42 through tank 16 to a drain 26 from the side of trailer 10.

Figure 3:
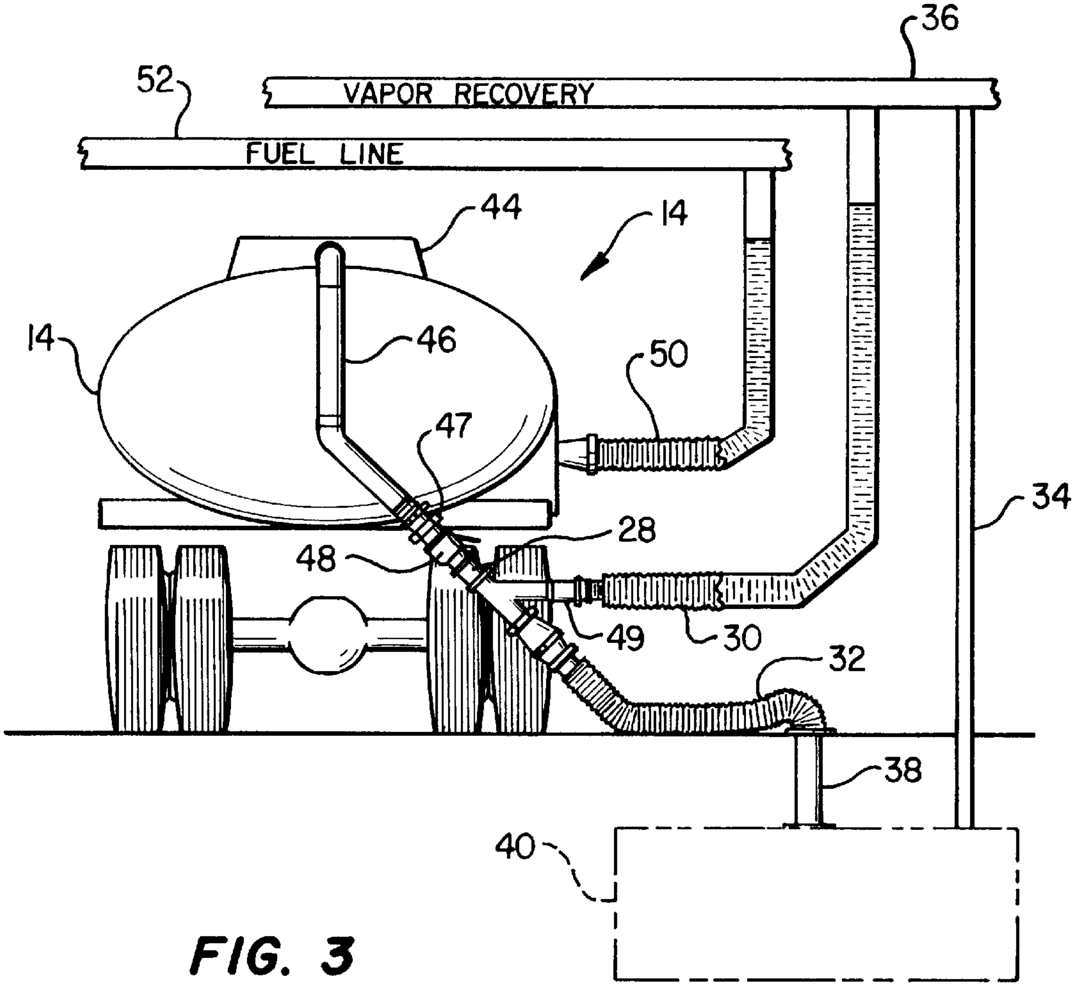
FIG. 3 is a rear elevation of an embodiment of the invention employed with another design of tanker truck.

FIG. 3 illustrates an embodiment of the invention applied to a tanker truck 14 having an external downpipe 46 for conveying overflowing liquid fuel. An overhead fuel line 52 supplies a feed pipe 50 connected to an inlet on the side of tanker truck 14. Through an arrangement of internal pipes and valves (not shown) fuel is forced from the bottom into compartments within tanker truck 14 in a manner similar to that described for the embodiment of FIG. 1. Similarly, overfilled compartments discharge fuel through valves to a channel which in turn is connected to downpipe 46 which extends around the back of a tanker truck 14 from dome 44. An outlet end or drain 47 from downpipe 46 is coupled by a quick release connection 48 to a Y or T-section pipe segment 49 (a Y-section segment is illustrated). Segment 49 divides fluid flow between vapor, which is passed to pipe 30 to a vapor recovery line 36, and liquids which pass through to line 32 to a inlet pipe 38 to receiving tank 40. Pipes 32 and 30 may be made of flexible hose to allow easy positioning of quick release valve 48.

Figure 4:
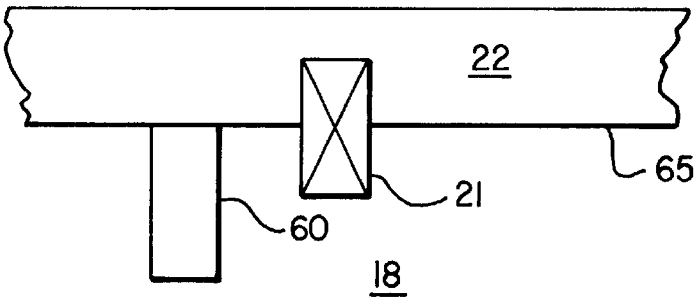
FIG. 4 is a schematic of vapor release valve coupling between a fuel compartment and an overhead vapor channel.

FIG. 4 illustrates positioning of a representative vapor release valve 21 through the top wall 65 of a fuel compartment 18. Valve 21 connects compartment 18 to channel 22 running along the top of the compartment. A sensor 60 is positioned at the top of compartment 18 to detect liquid levels reaching the top of a compartment. Failure of sensor 60 can lead to a failure to detect liquid being forced through vapor release valve 21 into channel 22.

While the invention is shown in only one of its forms, it is not thus limited but is susceptible to various changes and modifications without departing from the spirit and scope of the invention.

What is claimed is:

1. Apparatus for recovering volatile fluids escaping from a mobile delivery tank during filling, the mobile delivery tank having a vapor vent from the top of the mobile delivery tank, a channel in fluid communication with the vapor vent, an inlet for bottom filling of the mobile delivery tank, and a downpipe with drain from the channel accessible from outside the mobile delivery tank, the apparatus comprising:

a recovery tank;

an overhead vapor recovery line;

a vapor relief line connected between the recovery tank and the overhead vapor recovery line;

a branching connector having a releasable attachment inlet for temporary connection to the drain from the downpipe; and the branching connecter dividing into liquid and vapor return paths with the liquid return path being in fluid communication with the recovery tank and a vapor return path being in fluid communication with the overhead vapor recovery line.

2. Apparatus as claimed in claim 1, further comprising:

an attachment point allowing connection of the vapor return path to the vapor relief line which provides for fluid communication to the overhead vapor recovery line.

* * * * *